June 29, 1937.  K. E. PEILER  2,085,328
FOREHEARTH FOR MOLTEN GLASS
Filed Dec. 14, 1935  2 Sheets—Sheet 1
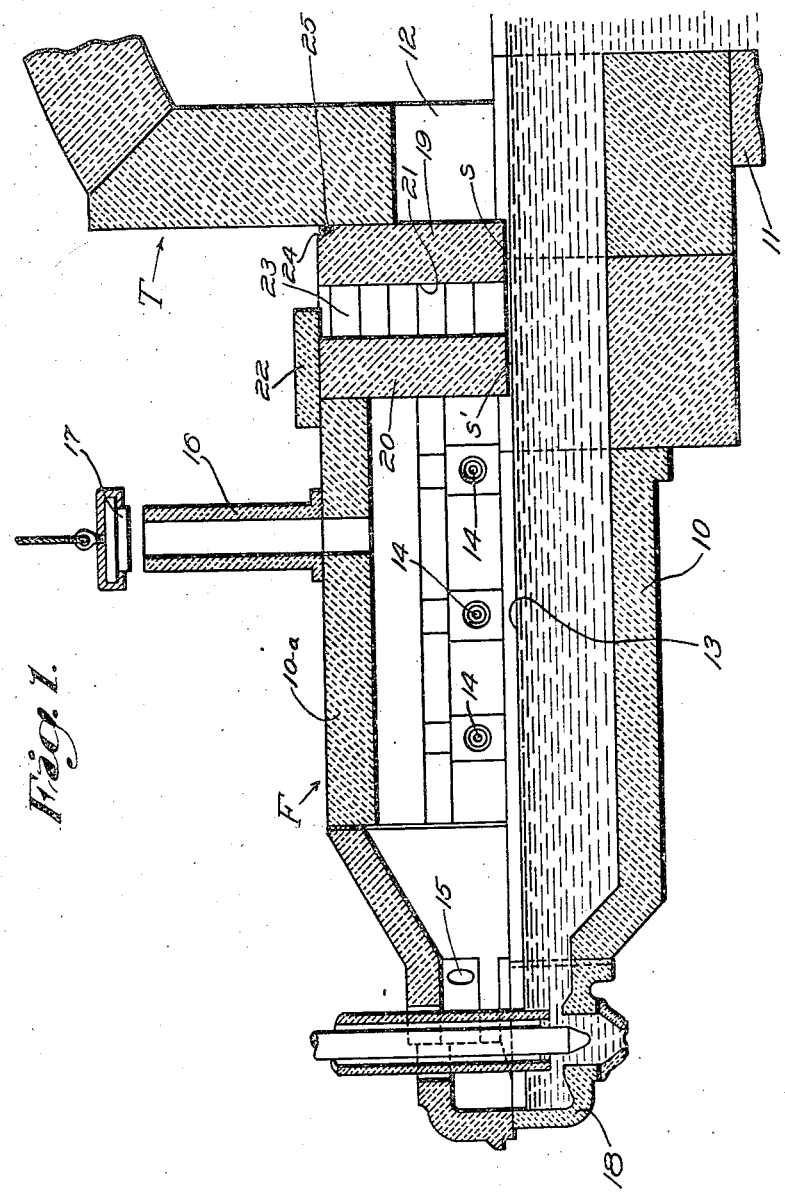
Inventor:
Karl E. Peiler
by Brown & Parham
Attorneys
Witness:
W. B. Thayer.

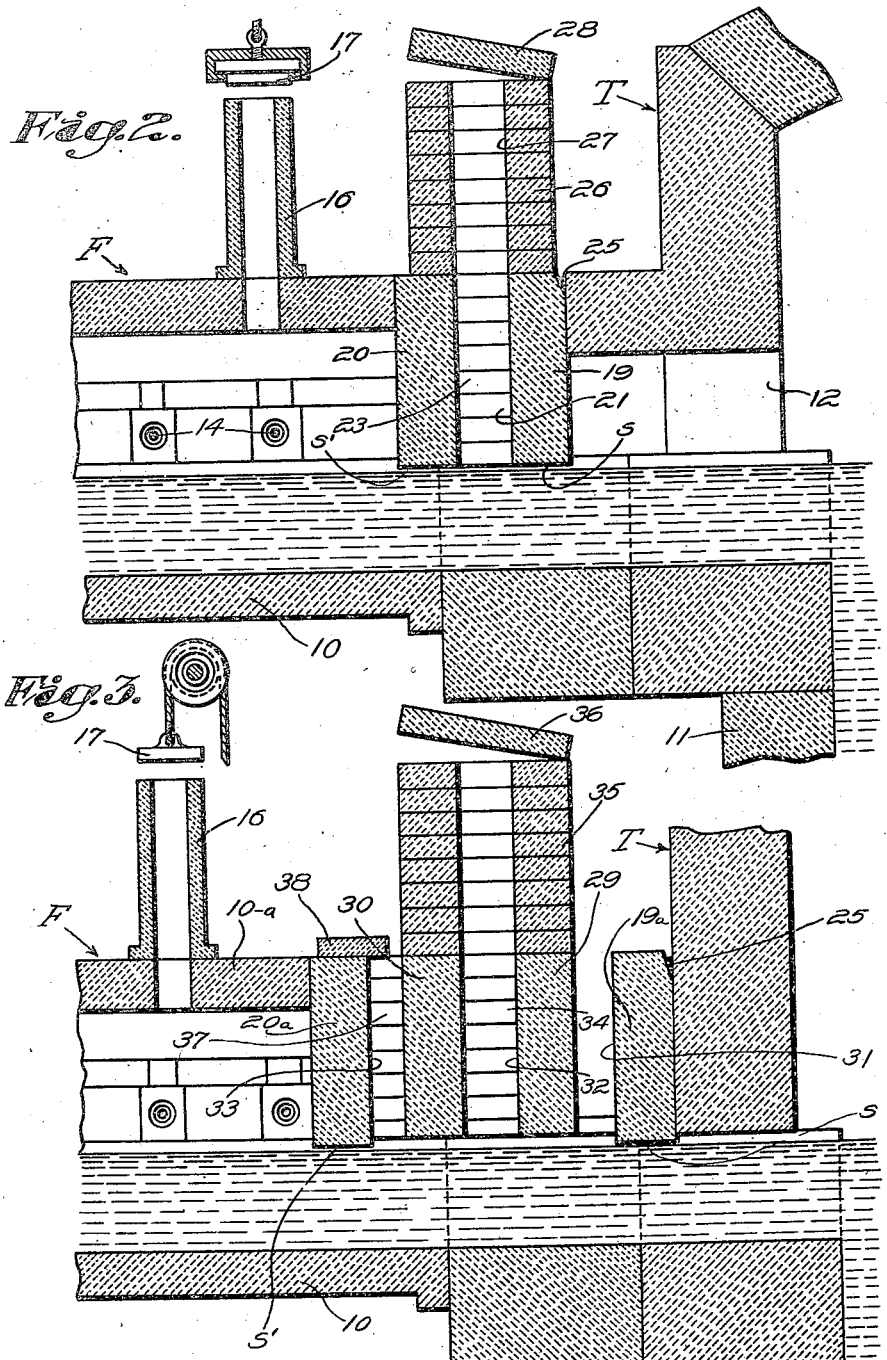

Patented June 29, 1937

2,085,328

UNITED STATES PATENT OFFICE 2,085,328

FOREHEARTH FOR MOLTEN GLASS

Karl E. Peiler, West Hartford, Conn., assignor to Hartford-Empire Company, Hartford, Conn., a corporation of Delaware Application December 14, 1935, Serial No. 54,447

11 Claims. (Cl. 49—55)

This invention relates to improvements in forehearths for receiving molten glass from a melting furnace or tank and for conducting such glass to a feed spout, basin or other delivery chamber from which glass is to be fed, gathered, drawn or otherwise removed.

In the operation of such a forehearth, it is desirable to control the firing and temperature conditions in the forehearth independently of the draft and temperature conditions in the furnace. In other words, the heating or temperature regulating space above the glass in the forehearth should be so separated from the space above the glass in the furnace as to prevent influence of draft or pressure changes in the furnace on the conditions in the forehearth. Otherwise, changes of draft and of pressure in the space above the glass in the working end of the furnace will seriously interfere with proper control and adjustment of temperature conditions in the forehearth.

In many furnaces, there is considerable positive pressure in the space above the glass in the refining or working end thereof. This pressure will cause passage of hot gases from the furnace into a forehearth connected to the working end of the tank unless such passage of hot gases is prevented.

It is customary in constructing and operating forehearths to seal off the space above the glass in the forehearth from that in the adjacent portion of the furnace by the use of a seal-off block which is located at or close to the juncture of the forehearth and furnace walls and dips into the glass to a slight distance below the level thereof. The use of such a seal-off block is attended by certain difficulties and undesirable results.

Such a block wears away by erosion because of contact of the hot glass therewith and provision must be made to permit frequent replacement of worn blocks. The necessity for such replacement gives rise to an awkward problem in some factories, particularly in those factories in which the gas pressure above the glass in the furnaces is relatively high. In such factories, the work of removing a worn block is difficult and the installation of a new block to replace that removed is even more difficult.

Also, in modern furnace practice, glass is melted in a furnace of a given size in much greater quantities and at higher melting rates than previously. Consequently, the furnace is operated with relatively high temperatures in the refining or working end thereof. Under these conditions, refractory bricks and fragments of refractory walls frequently break away from the stationary walls and fall into the glass by which they are floated to a position behind the seal-off block. Here they lodge. Under the severe modern operating conditions to which a furnace is subjected, the surface glass therein frequently is contaminated, as by matters produced by the solution of refractories or the reaction of chemicals therewith or sometimes from the fuel itself. This contaminated glass accumulates behind the seal-off block and behind any floating pieces of refractory which have lodged there. Such a condition causes cords or streaks of contaminated glass which are dragged into the forehearth. These in turn cause defects in the glass that is removed at the delivery end of the forehearth, whether such removal of glass be effected by the feeding of glass through a submerged orifice for the production of mold charges, by suction gathering or otherwise.

The defects persist in the articles which are formed of the portions of glass removed or charges fed and tend to make annealing of such articles more difficult and sometimes impossible. Even though annealing of such articles may be effected without breakage of the articles, hair lines, streaks or other defects therein may impair the appearance and the salability or intended use of such articles.

The above and other defects in the portions of glass fed or otherwise removed from such a forehearth may be obviated or substantially reduced by removal of the seal-off block. This, however, not only leads to other difficulties, as above pointed out, occasioned by the interference of draft and pressure conditions in the furnace with the conditions above the glass in the forehearth but also tends to cause premature destruction or impairment of the forehearth walls above the glass line. Such premature destruction or impairment of these walls may be caused by the action thereon of furnace gases, laden with alkali vapors and frequently with sulphur compounds, which, in the absence of a seal-off block, may pass into the forehearth at high velocity and in large volume.

An object of the present invention is to obviate the difficulties above mentioned by providing a forehearth which is so constructed at or adjacent to its juncture with a supply furnace or tank as practically to prevent passage of hot gases and pressure fluid from the furnace to the forehearth without requiring the use of a seal-off block in contact with the glass supply stream.

Another object of the invention is to provide for the relief of pressure from the space above the glass at the juncture of the forehearth with its supply furnace or tank without interposing any dam or barrier to the flow of the surface glass of the stream passing from the furnace or tank to the forehearth and therefore without causing accumulation of floating refractory matter or contaminated glass at the glass-receiving end of the forehearth.

A further object of the invention is to provide for venting to the atmosphere such pressure fluid and gases as may escape from the supply furnace to the space above the glass entering the forehearth without interfering with independent control and regulation of temperature and draft conditions within the forehearth.

In carrying out the invention, practical separation of the space above the glass in the forehearth from that above the glass in the supply furnace or tank, may be effected by the provision of a plurality of spaced transverse baffle blocks or barriers at the glass receiving end of the forehearth, these barriers or baffles being arranged to extend almost but not quite to the surface of the underlying stream of glass and being spaced apart so as to provide a vent or vents for the relief of such pressure fluid or gases as may pass from the furnace through the relatively small space beneath the first baffle block or barrier. These baffle blocks or barriers are associated with or suplemented by suitable structural arrangements for cooperating therewith to effect the venting or relief of such pressure fluid or gases while maintaining a condition in the space between the outermost baffle block or barrier and the underlying glass that will have a substantially neutral effect on draft and temperature conditions within the forehearth proper.

Other objects and advantages of the invention will hereinafter be pointed out, or will become apparent from the following description of certain illustrative structural embodiments of the invention as shown in the accompanying drawings, in which:

Figure 1 is a longitudinal vertical section through a forehearth equipped with a simple arrangement of structural elements for carrying out the invention, the view being more or less diagrammatic;

Fig. 2 is a slightly enlarged fragmentary longitudinal vertical section through a portion of a forehearth equipped with a practical embodiment of the invention having a somewhat wider range of possible use than that shown in Fig. 1; and Fig. 3 is a view similar to Fig. 2 but showing a practical embodiment of the invention having a still greater range of utility, including adaptability for use with a furnace in which the gas pressure at the working end is extremely high.

Referring now to Fig. 1, a forehearth generally designated F has a glass conducting channel 10 connected in any suitable known manner to the adjacent wall 11 of a glass melting furnace or tank T. The arrangement is such that glass from the working or refining end of the furnace or tank may flow into the forehearth channel 10 through an opening 12 in the furnace wall in a stream which may have a level in the forehearth as indicated at 13.

The space above the glass in the forehearth is enclosed by a suitable cover structure 10—a. Such cover structure may be provided with side openings for burners 14 and other burner openings adjacent to the front thereof, such as that indicated at 15. A stack 16 communicates with the rearward portion of the space above the glass in the forehearth and may be provided with a suitable adjustable damper or control means represented by the cover 17.

In the particular structure shown in Fig. 1, the outer or delivery end portion of the forehearth channel is shown as being a feed spout or bowl 18 having a bottom discharge outlet from which glass may be fed as required for the production of mold charges. It is to be noted, however, that in lieu of such a bottom discharge feed spout or bowl, the outer or delivery end portion of the forehearth channel may be suitably formed, substantially as shown in Fig. 6 of my Patent No. 1,893,061 of January 3, 1933, for example, to hold a pool of molten glass from which glass may be removed by suction gathering molds or to permit removal of glass in any other suitable known manner. In other words, the delivery end portion of the forehearth may be of any suitable known construction and be adapted to permit removal of glass therefrom in any suitable known way. The forehearth, generally described, may be of any suitable known construction and supplied with any suitable known appurtenances and equipment.

In order to effect practical separation of the space above the glass in the forehearth from that in the adjacent portion of the supply furnace or tank, and to do this without requiring contact of a refractory separator or seal-off member with the molten glass, the invention may provide a pair of spaced transverse refractory barriers or baffles, such as indicated at 19 and 20, respectively, in Fig. 1. The lower or bottom surfaces of these barriers or baffles terminate just above the level of the underlying glass stream so that but very limited spaces, $s$ and $s'$, respectively, exist between them and the glass for the passage of gases. The space between these barriers or baffles constitutes a venting passage or chamber 21 which is open at its top to the atmosphere. The area of the top outlet of this venting passage or chamber may be varied by a suitable adjustable damper or like means, which may be an adjustable cover block 22 or a plurality of such blocks. Refractory bricks, such as indicated at 23, may be provided to close the space between the barriers or baffles 19 and 20 at their ends and over the side walls of the forehearth channel, either part or all the way to the top of the forehearth cover structure, as desired.

The rearmost barrier or baffle 19 covers the portion of the opening 12 in the furnace wall from the top of such opening substantially to the glass level. Preferably, this rearmost barrier or baffle is sealed tightly to the furnace wall so as to prevent leakage of gases from the opening 12 between such barrier or baffle and the adjacent furnace wall. Such leakage of gases, if not prevented, would tend to cause erosion and destruction of the adjacent portions of the furnace wall and barrier or baffle block. As one way of guarding against such leakage, the barrier or baffle 19 may be formed with a rabbet or chamfer, as at 24, next to the furnace wall, and a suitable plastic cement or sealing material may be tamped into such rabbet or chamfer, as at 25, to provide a gas-tight joint. Such a seal may be provided down around the ends of the barrier or baffle block 19 so that the latter may be properly sealed to the furnace wall.

The operations of the embodiment of the invention shown in Fig. 1 will be readily understood.

The barrier or baffle 19 will exclude from the forehearth most of the hot gases and pressure fluid in the adjacent portion of the supply furnace or tank. Such furnace gases and pressure fluid as may pass outwardly from the supply furnace or tank through the small space s will be vented to the atmosphere through the venting passage or chamber 21.

The effective outlet of the venting passage 21, the size of which may be predetermined by using more or less of the side bricks 23 and adjusted by the adjustable cover block or cover blocks, will be greater than either the restricted space s beneath the barrier or baffle 19, or the restricted space s', beneath the outer barrier or baffle 20. The arrangement is such as to relieve pressure within the venting passage or chamber 21 without permitting the building up therein of sufficient pressure to force any of the furnace gases through the space s' into the firing or temperature regulating space above the glass in the forehearth.

The temperature and draft conditions within the forehearth space thus may be controlled by adjustment of the burner or burners, or other adjustable means for regulating temperature conditions in the forehearth and by adjustment of the damper of the forehearth stack or other suitable draft controlling means practically free from influence of hot gases and pressure in the working end of the furnace, or of variations therein.

Since the space s' beneath the outer barrier or baffle 20 is of relatively slight or restricted area and pressure is relieved in the venting passage or chamber by the draft therein, the condition in the space s' beneath the outer barrier or baffle 20 will be substantially neutral. Even though a slight sting-out through the restricted space s' from the forehearth to the venting passage or chamber 21 should occur, this would not be harmful nor change or influence the draft and temperature conditions within the forehearth, assuming that the latter is operating with a plus pressure therein, as usually is desirable.

The embodiment of the invention shown in Fig. 2 differs from that shown in Fig. 1, primarily in that a stack 26 has been built up or superimposed on the walls of the venting passage or chamber 21 so as to extend such venting passage or chamber, as at 27, to a higher level, as to a level approximating that of the upper end of the forehearth stack 16. The stack 26 may be provided with an adjustable damper or cover block, represented by the block 28, and may be built in any suitable known manner of suitable refractory materials. In this form of construction, the sides of the venting passage or chamber 21, between the ends of the barriers or baffles 19 and 20, are closed tightly, as by use of the side bricks 23.

The structure shown in Fig. 2 operates in substantially the same manner as that shown in Fig. 1 but has a greater range of operating utility than the simpler form of structure. The construction shown in Fig. 2 has an adjustable draft effect, which may be regulated, as by the adjustable cover block 28, so as satisfactorily to relieve pressure within the venting passage or chamber when the gas pressure in the adjacent portion of the furnace is higher than that in a furnace with which the structure of Fig. 1 is best adapted for use. The arrangement is such as to permit venting of the furnace gases from the venting passage or chamber and relief of pressure in the latter without permitting any of such gases to be forced through the space s' into the forehearth or, in other words, while maintaining a condition in the space s' that will have a substantially neutral effect on the temperature and draft conditions in the forehearth.

For use to satisfy different operating conditions in a still wider range, and particularly for use with a furnace in which the gas pressure above the glass at the working end of the furnace is still higher, a construction as shown in Fig. 3 may be employed.

This embodiment of the invention, like those hereinbefore described, includes two spaced transverse barriers or baffles, indicated at 19a and 20a respectively, beneath which are the very small or restricted spaces s and s'. These barriers or baffles 19a and 20a are spaced farther apart than the barriers or baffles 19 and 20 of the preceding structures so as to allow the interposition of two additional spaced transverse barriers or baffles 29 and 30, respectively.

With this arrangement, a venting passage 31 is provided between the barriers 19a and 29, another venting passage 32 is provided between the barriers or baffles 29 and 30, and a third passage, indicated at 33, is provided between the barriers 30 and 20a.

The venting passage 32 may be closed at its sides, at the ends of the barriers or baffles 29 and 30, as by brick 34, and a stack 35 may be built or superimposed on the walls of such venting passage. An adjustable damper or cover block, such as indicated at 36, may be provided for the stack 35.

The passage 31 between the barrier or baffles 19a and the barrier or baffle 29 may be closed at its sides to the height desired by bricks, or may be left open at its sides, as shown in Fig. 3.

The passage 33 preferably is bricked in at the sides, as by bricks 37. An adjustable damper or cover block or blocks, represented by the block 38, may be provided for regulably controlling the upper end of the passage 33.

The intermediate spaced transverse barriers or baffles 29 and 30 have their lower surfaces located relatively close to the glass but preferably at a higher level than the lower surfaces of the members 19a and 20a. The passages 31, 32 and 33 thus are connected in series at their lower ends by a common pressure relieving or venting chamber or space which extends from the member 19a to the member 20a.

A typical operation of the structure shown in Fig. 3 may be substantially as follows. The damper or cover block 36 is set to produce a desirable draft in view of the volume and pressure of the hot gases which have been forced outwardly from the furnace through the space s beneath the barrier or baffle 19a. The venting passage 31 will be effective to conduct to the atmosphere some and, at times, most of such gases. Such gases as are forced outwardly beyond the passage 31 and beneath the transverse barrier or baffle 29 will be vented to the atmosphere through the passage 32 by the draft in the latter.

The damper or cover block 38 may be set, with relation to the draft through the venting passage 32, to permit sufficient indraft of air through the passage 33 as may be required to prevent the draft in the passage 32 from pulling an undesirable amount of gases out of the forehearth. Also, in case the pressure of the escaping furnace gases is exceedingly high, the passage 33 will function as a venting passage to take care of such gases as may have been forced under the member 30 toward the space s' beneath the barrier or baffle 20a.

The condition in the space s' thus may be maintained substantially neutral under varying pressure conditions in the adjacent portion of the supply furnace or tank and even though excessive pressure in the latter has forced hot furnace gases through the restricted passage s in considerable volume and at relatively high velocity.

The structure shown in Fig. 3 of course may be adjusted to operate under less severe conditions, as with furnaces in which the gas pressure at the working end is relatively low.

Each of the several embodiments of the invention shown in the drawings effects a practical separation of the space above the glass in the forehearth from that in the working end of the tank without obstructing the surface of the glass stream extending from the furnace into and along the forehearth channel. Floating material and contaminated glass at the surface of the supply stream thus are prevented from accumulating and forming a source of cords, streaks or surface marks in the glass fed or otherwise removed from the forehearth. Any floating pieces of refractory in the glass stream entering the forehearth will pass to the outer end thereof, whence they may be removed bodily after a removable portion of the forehearth cover structure has been temporarily displaced. Such contaminated glass as passes into the forehearth will be dispersed more or less and diffused in the glass stream and will not have the harmful effect that is occasioned by a concentration of such contaminated glass, as when there is an obstruction to the flow of glass at the surface of the supply stream at the intake end of the forehearth channel.

Still other practical embodiments of the invention may be provided without departing from the spirit and scope of the invention which, therefore, is not to be limited beyond the terms of the appended claims.

I claim:

1. The combination with a glass melting furnace of a forehearth having a channel along which glass from said furnace may flow in a stream, a cover structure cooperating with said channel to provide a substantially enclosed space above the glass in said forehearth channel, a structure constituting a pressure fluid venting passage located adjacent to the juncture of said forehearth channel with said furnace, said venting passage structure extending the full width of the interior of said forehearth and terminating at its lower end close to but above the surface of said stream of glass for preventing passage of gases under pressure from said furnace to said enclosed space without obstructing flow of glass at the surface of said stream, said venting passage communicating at its top with the atmosphere and at its bottom with the interior of the furnace above the glass level only through a narrow space between the bottom of the rear wall of said venting passage and the underlying glass stream and with the enclosed space in said forehearth only through a similar narrow space between the opposite wall of said venting passage and said underlying stream of glass.

2. The combination with a glass melting furnace of a forehearth having a channel along which glass from said furnace may flow in a stream, a cover structure cooperating with said channel to provide a substantially enclosed space above the glass in said forehearth channel, a structure constituting a pressure fluid venting passage located adjacent to the juncture of said forehearth channel with said furnace, said venting passage structure extending the full width of the interior of said forehearth and terminating at its lower end close to but above the surface of said stream of glass for preventing passage of gases under pressure from said furnace to said enclosed space without obstructing flow of glass at the surface of said stream, said venting passage communicating at its top with the atmosphere and at its bottom with the interior of the furnace above the glass level only through a narrow space between the bottom of the rear wall of said venting passage and the underlying glass stream and with the enclosed space in said forehearth only through a similar narrow space between the opposite wall of said venting passage and said underlying stream of glass, and means for controlling the draft in said venting passage.

3. The combination with a melting furnace of a forehearth having a channel connected at one end with said furnace so that glass from the furnace may flow in a stream through an opening in the adjacent wall of the furnace into and along said forehearth channel, a cover structure for said forehearth channel cooperating with the latter to provide a substantially enclosed space above the glass in said forehearth, a pair of spaced transverse baffle members separating said enclosed space of the forehearth from said opening in said furnace wall above the glass in said forehearth channel except for narrow spaces between said transverse baffles and the underlying portions of the glass in said forehearth channel, the space between said transverse baffles communicating at its top with the atmosphere and constituting a venting passage for gases forced thereinto from said furnace, said spaced baffle members and the venting passage therebetween serving to prevent passage of gases under pressure from said furnace to said enclosed space without obstructing flow of glass at the surface of said stream.

4. The combination with a glass melting furnace of a forehearth comprising a channel connected at one end with said furnace so that glass may flow in a stream from the furnace through an opening in a side wall of the furnace into and along said forehearth channel, a transverse baffle disposed in substantially gas-tight contact with said furnace wall above said opening therein and depending below the top of said opening across said forehearth channel nearly but not quite to the level of the glass therein, a second transverse baffle spaced from the first baffle and terminating at its lower edge close to but slightly above the surface of the glass in said forehearth channel, the space between said transverse baffles constituting a vent which communicates at its top with the atmosphere and at its lower end with the opening in said furnace wall only through a narrow space at the bottom of said first transverse baffle, and a cover structure cooperating with said baffles and with said forehearth channel to substantially enclose the space above the glass in said forehearth channel, said last named space communicating with said vent only through a narrow space at the bottom of said second transverse baffle, said spaced transverse baffles and the vent between them serving to prevent passage of gases under pressure from said furnace to said enclosed space without obstructing flow of glass at the surface of said stream.

5. The combination with a glass melting furnace of a forehearth comprising a channel connected at one end with said furnace so that glass may flow in a stream from the furnace through an opening in a side wall of the furnace into and along said forehearth channel, a transverse baffle disposed in substantially gas-tight contact with said furnace wall above said opening therein and depending below the top of said opening across said forehearth channel nearly but not quite to the level of the glass therein, a second transverse baffle spaced from the first baffle and terminating at its lower edge close to but slightly above the surface of the glass in said forehearth channel, the space between said transverse baffles constituting a vent which communicates at its top with the atmosphere and at its lower end with the opening in said furnace wall only through a narrow space at the bottom of said first transverse baffle, a cover structure cooperating with said baffles and with said forehearth channel to substantially enclose the space above the glass in said forehearth channel, said last named space communicating with said vent only through a narrow space at the bottom of said second transverse baffle, said spaced transverse baffles and the vent between them serving to prevent passage of gases under pressure from said furnace to said enclosed space without obstructing flow of glass at the surface of said stream and means for regulably controlling the effective area of the vent between said transverse baffles.

6. The combination with a glass melting furnace of a forehearth comprising a channel connected at one end with said furnace so that glass may flow in a stream from the furnace through an opening in a side wall of the furnace into and along said forehearth channel, a transverse baffle disposed in substantially gas-tight contact with said furnace wall above said opening therein and depending below the top of said opening in the furnace wall across said forehearth channel nearly but not quite to the level of the glass therein, a second transverse baffle spaced from the first baffle and terminating at its lower edge close to but slightly above the surface of the glass in said forehearth channel, the space between said transverse baffles constituting a vent which communicates at its top with the atmosphere and at its lower end with the opening in said furnace wall only through a narrow space at the bottom of said first transverse baffle, a cover structure cooperating with said baffles and with said forehearth channel to substantially enclose the space above the glass in said forehearth channel, said last named space communicating with said vent only through a narrow space at the bottom of said second transverse baffle, said spaced transverse baffles and the vent between them serving to prevent passage of gases under pressure from said furnace to said enclosed space without obstructing flow of glass at the surface of said stream and a stack superimposed on said transverse baffles, the interior of said stack constituting an extension of said vent and communicating at its upper end with the atmosphere.

7. The combination with a glass melting furnace of a forehearth comprising a channel connected at one end with said furnace so that glass may flow in a stream from the furnace through an opening in a side wall of the furnace into and along said forehearth channel, a transverse baffle disposed in substantially gas-tight contact with said furnace wall above said opening therein and depending below the top of said opening in the furnace wall across said forehearth channel nearly but not quite to the level of the glass therein, a second transverse baffle spaced from the first baffle and terminating at its lower edge close to but slightly above the surface of the glass in said forehearth channel, the space between said transverse baffles constituting a vent which communicates at its top with the atmosphere and at its lower end with the opening in said furnace wall only through a narrow space at the bottom of said first transverse baffle, a cover structure cooperating with said baffles and with said forehearth channel to substantially enclose the space above the glass in said forehearth channel, said last named space communicating with said vent only through a narrow space at the bottom of said second transverse baffle, said spaced transverse baffles and the vent between them serving to prevent passage of gases under pressure from said furnace to said enclosed space without obstructing flow of glass at the surface of said stream, a stack superimposed on said transverse baffles, the interior of said stack constituting an extension of said vent and communicating at its upper end with the atmosphere, and means for adjustably controlling the draft in said stack.

8. The combination with a glass melting furnace, of a forehearth comprising a channel having an end portion thereof connected with a wall of said furnace so that glass may flow in a stream from said furnace through an opening in said wall of the furnace into and along said forehearth channel, a pair of spaced transverse refractory baffles located entirely above the level of the glass in said forehearth channel, the rearmost of said baffles being disposed in substantially gas-tight contact with said wall of the furnace above said opening therein and depending for the full width of said forehearth channel nearly but not quite to the level of the glass in said channel, the second transverse baffle also extending the full width of the forehearth channel and depending nearly but not quite to the level of the glass in the latter, a cover structure cooperating with said forehearth channel and with said second transverse baffle to enclose the space above the glass in said forehearth channel in advance of a second transverse baffle, and a structure forming a vertical venting passage located between said baffles and in spaced relation therewith, said vertical venting passage structure, said spaced transverse refractory baffles and the spaces between said baffles and the venting passage structure serving cooperatively to prevent passage of gases under pressure from said furnace to the space above the glass in the forehearth channel without obstructing flow of glass at the surface of said stream.

9. The combination with a glass melting furnace, of a forehearth comprising a channel having an end portion thereof connected with a wall of said furnace so that glass may flow in a stream from said furnace through an opening in said wall of the furnace into and along said forehearth channel, a pair of spaced transverse refractory baffles located entirely above the level of the glass in said forehearth channel, the rearmost of said baffles being disposed in substantially gas-tight contact with said wall of the furnace above said opening therein and depending for the full width of said forehearth channel nearly but not quite to the level of the glass in said channel, the second transverse baffle also extending the full width of the forehearth channel and depending nearly but not quite to the level of the glass in the latter, a cover structure cooperating with said forehearth channel and with said second transverse baffle to enclose the space above the glass in said forehearth channel in advance of a second transverse baffle, and a structure forming a vertical venting passage located between said baffles and in spaced relation therewith, the space between said venting passage and said rearmost baffle communicating with the atmosphere and constituting a rear venting passage.

10. The combination with a glass melting furnace, of a forehearth comprising a channel having an end portion thereof connected with a wall of said furnace so that glass may flow in a stream from said furnace through an opening in said wall of the furnace into and along said forehearth channel, a pair of spaced transverse refractory baffles located entirely above the level of the glass in said forehearth channel, the rearmost of said baffles being disposed in substantially gas-tight contact with said wall of the furnace above said opening therein and depending for the full width of said forehearth channel nearly but not quite to the level of the glass in said channel, the second transverse baffle also extending the full width of the forehearth channel and depending nearly but not quite to the level of the glass in the latter, a cover structure cooperating with said forehearth channel and with said second transverse baffle to enclose the space above the glass in said forehearth channel in advance of said second transverse baffle, and a structure forming a vertical venting passage located between said baffles and in spaced relation therewith, the space between said venting passage and said rearmost baffle communicating with the atmosphere and constituting a rear venting passage, the space between said first venting passage and the second transverse baffle communicating at its upper end with the atmosphere.

11. The combination with a glass melting furnace, of a forehearth comprising a channel having an end portion thereof connected with a wall of said furnace so that glass may flow in a stream from said furnace into and along said forehearth channel, a pair of spaced transverse refractory baffles located entirely above the level of the glass in said forehearth channel, the rearmost of said baffles being disposed in substantially gas-tight contact with said wall of the furnace above said opening therein and depending for the full width of said forehearth channel nearly but not quite to the level of the glass in said channel, the second transverse baffle also extending the full width of the forehearth channel and depending nearly but not quite to the level of the glass in the latter, a cover structure cooperating with said forehearth channel and with said second transverse baffle to enclose the space above the glass in said forehearth channel in advance of a second transverse baffle, a structure forming a vertical venting passage located between said baffles and in spaced relation therewith, the space between said venting passage and said rearmost baffle communicating with the atmosphere and constituting a rear venting passage, the space between said first venting passage and the second transverse baffle communicating at its upper end with the atmosphere, means for regulably controlling the draft in said first named venting passage, and means for varying the effective area of the upper end of the space between said first named venting passage and said second transverse baffle.

KARL E. PEILER.